United States Patent
Zhang et al.

(10) Patent No.: US 9,515,568 B2
(45) Date of Patent: Dec. 6, 2016

(54) POWER CONVERTER WITH A FIRST STRING HAVING DIODES AND A SECOND STRING HAVING SWITCHING UNITS

(71) Applicant: GENERAL ELECTRIC COMPANY, Schenectady, NY (US)

(72) Inventors: Di Zhang, Niskayuna, NY (US); Rixin Lai, Clifton Park, NY (US); Luis Jose Garces, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 92 days.

(21) Appl. No.: 14/229,074

(22) Filed: Mar. 28, 2014

(65) Prior Publication Data

US 2015/0280605 A1    Oct. 1, 2015

(51) Int. Cl.
  *H02M 7/217*     (2006.01)
  *H02M 7/219*     (2006.01)
  *H02M 7/487*     (2007.01)
  *H02M 7/483*     (2007.01)

(52) U.S. Cl.
  CPC ............ *H02M 7/217* (2013.01); *H02M 7/219* (2013.01); *H02M 7/487* (2013.01); *H02M 2007/4835* (2013.01)

(58) Field of Classification Search
  CPC .......... H02M 1/32; H02M 1/34; H02M 7/487; H02M 7/7575; H02M 2001/4835; H02M 7/217
  See application file for complete search history.

(56) References Cited

U.S. PATENT DOCUMENTS

| 5,903,066 | A | 5/1999 | Enjeti et al. | |
| 5,949,669 | A * | 9/1999 | Bruckmann | B60L 9/16 363/132 |
| 6,150,731 | A | 11/2000 | Rinaldi et al. | |
| 7,219,673 | B2 | 5/2007 | Lemak | |
| 7,835,166 | B2 * | 11/2010 | Hiller | H02M 7/483 363/132 |

(Continued)

FOREIGN PATENT DOCUMENTS

CN    201774458 U    3/2011
CN    102916603 A    2/2013

(Continued)

OTHER PUBLICATIONS

Adam et al., "New Flying Capacitor Multilevel Converter", IEEE International Symposium on Industrial Electronics (ISIE), pp. 335-339, Jun. 27, 2011.

(Continued)

*Primary Examiner* — Matthew Nguyen
*Assistant Examiner* — Yusef Ahmed
(74) *Attorney, Agent, or Firm* — Nitin N. Joshi

(57) ABSTRACT

A power converter is presented. The power converter includes at least one leg, the at least one leg includes a first string, where the first string includes a plurality of diodes, a first connecting node, and a second connecting node, and where the first string is operatively coupled across a first bus and a second bus. Furthermore, the at least one leg includes a second string operatively coupled to the first string via the first connecting node and the second connecting node, where the second string includes a plurality of switching units.

16 Claims, 7 Drawing Sheets

(56) References Cited

U.S. PATENT DOCUMENTS

| | | | | |
|---|---|---|---|---|
| 7,960,871 | B2* | 6/2011 | Dommaschk | H02M 7/483 307/151 |
| 7,969,755 | B2* | 6/2011 | Davies | H02J 3/1864 363/35 |
| 8,045,346 | B2* | 10/2011 | Abolhassani | H02M 7/49 363/37 |
| 8,564,994 | B2* | 10/2013 | Capitaneanu | H02M 7/487 363/132 |
| 8,649,187 | B2* | 2/2014 | Aiello | H02M 7/49 363/131 |
| 8,908,405 | B2* | 12/2014 | Yang | H02M 1/34 363/131 |
| 8,942,014 | B2* | 1/2015 | Norrga | H02M 1/32 363/68 |
| 2006/0044857 | A1* | 3/2006 | Lemak | H02M 7/487 363/132 |
| 2006/0056209 | A1* | 3/2006 | Blidberg | H02M 7/487 363/63 |
| 2009/0262477 | A1* | 10/2009 | Dorn | H01H 85/0241 361/58 |
| 2009/0295225 | A1* | 12/2009 | Asplund | H02M 7/7575 307/31 |
| 2011/0019449 | A1* | 1/2011 | Katoh | H02M 1/088 363/124 |
| 2011/0115532 | A1* | 5/2011 | Roesner | H02M 7/487 327/136 |
| 2013/0063070 | A1* | 3/2013 | Zhang | H02P 27/14 318/729 |
| 2013/0094265 | A1* | 4/2013 | Lai | H02M 7/487 363/131 |
| 2014/0009988 | A1* | 1/2014 | Valiani | H02M 7/487 363/131 |
| 2014/0092660 | A1* | 4/2014 | Zhang | H02M 7/217 363/127 |
| 2014/0092661 | A1* | 4/2014 | Zhang | H02M 7/5152 363/131 |
| 2014/0103650 | A1* | 4/2014 | Nguyen | F02N 11/087 290/31 |
| 2014/0169040 | A1* | 6/2014 | Schroeder | H02M 3/33507 363/21.01 |
| 2014/0185346 | A1* | 7/2014 | Liu | H03K 17/127 363/131 |
| 2014/0254228 | A1* | 9/2014 | Ying | H02M 7/5387 363/132 |
| 2014/0319919 | A1* | 10/2014 | Fu | H02M 7/539 307/82 |
| 2015/0036398 | A1* | 2/2015 | Garces | H02M 7/487 363/65 |
| 2015/0062991 | A1* | 3/2015 | Zhang | H02M 7/487 363/131 |
| 2015/0085546 | A1* | 3/2015 | Oughton, Jr. | H02M 7/797 363/127 |
| 2015/0091488 | A1* | 4/2015 | Zhang | H02P 27/06 318/519 |
| 2015/0188448 | A1* | 7/2015 | Perreault | H02M 7/217 363/89 |

FOREIGN PATENT DOCUMENTS

| | | |
|---|---|---|
| EP | 2713495 A2 | 4/2014 |
| EP | 2747269 A2 | 6/2014 |
| WO | 2012010053 A1 | 1/2012 |
| WO | 2012010066 A1 | 1/2012 |
| WO | 2012010068 A1 | 1/2012 |
| WO | 2013017353 A1 | 2/2013 |

OTHER PUBLICATIONS

Wang, "Research on Modular Multilevel Rectifier", Power Electronics and Electric Drive, pp. 1-79, Jun. 2012.

Michael et al., "On the Tradeoff Between Input Current Quality and Efficiency of High Switching Frequency PWM Rectifiers", IEEE Transactions on Power Electronics, vol. No. 27, Issue No. 7, pp. 3137-3149, Jul. 1, 2012.

European Search Report and Opinion issued in connection with corresponding EP Application No. 15161019 on Jul. 10, 2015.

Solanki et al., "A Modular Multilevel Converter Based High-Power High-Current Power Supply", Industrial Technology (ICIT), IEEE International Conference, pp. 444-450, Feb. 25-28, 2013.

Mittal et al., "Multi-Level Inverters: A Literature Survey on Topologies and Control Strategies", Power, Control and Embedded Systems (ICPCES), 2nd International Conference, pp. 1-11, Dec. 17-19, 2012.

Solanki et al., "A Completely Modular Power Converter for High-Power High-Current DC Applications", Industrial Electronics Society, IECON 2013—39th Annual Conference of the IEEE, pp. 151-156, Nov. 2013.

* cited by examiner

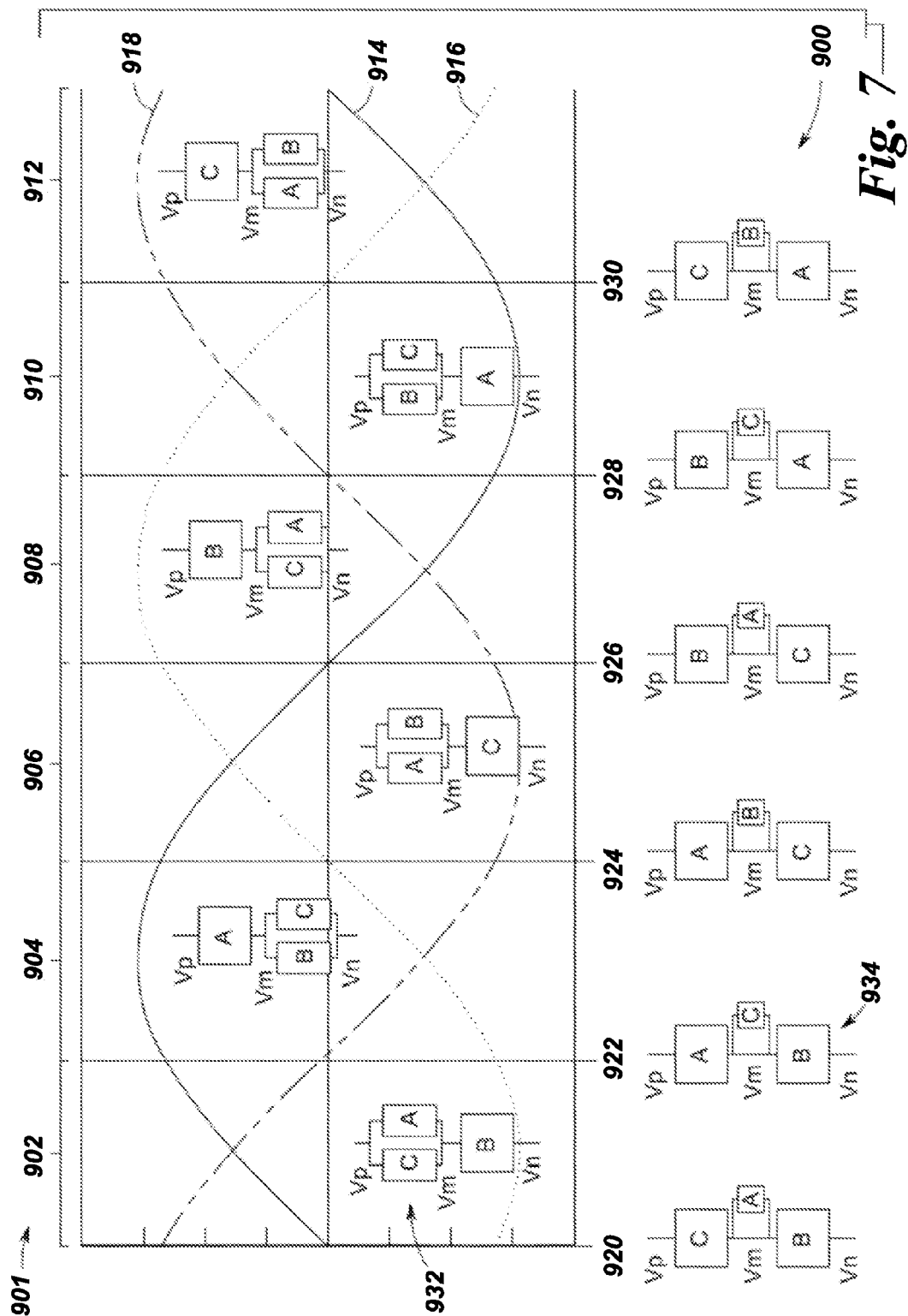

POWER CONVERTER WITH A FIRST STRING HAVING DIODES AND A SECOND STRING HAVING SWITCHING UNITS

BACKGROUND

The invention relates generally to power converters and more specifically to a multilevel converter.

In the last few decades, the field of power conversion has grown tremendously due to its imminent advantages in motor drives, renewable energy systems, high voltage direct current (HVDC) systems, and the like. For example, a subsea oil and gas production system which requires hundreds of megawatts of electric power may employ a HVDC transmission and distribution system for delivery of electric power. Such HVDC systems typically include a land-based or topside converter substation where the AC-to-DC power conversion is performed. The multilevel converter is emerging as a promising power conversion technology for such medium and high voltage applications.

Multilevel converters offer several advantages over ordinary two-level converters. For example, the power quality of the multilevel converter is better than that of two level converters. Also, the multilevel converters are ideal for interface between a grid and renewable energy sources such as photovoltaics (PV), fuel cells, wind turbines, and the like. In addition, the efficiency of the multilevel converter is relatively higher as a result of its minimum switching frequency.

In the recent times, the multilevel converters having a modular structure and without transformers have been designed. The modular structure of the converters, allows stacking of these converters to an almost unlimited number of levels. Also, the modular structure aids in scaling up to different power and voltage levels. However, certain currently available multilevel converters such as modular multilevel converters (MMC) typically employ a large number of fully controllable semiconductor switches, such as insulated gate bipolar transistors (IGBTs).

BRIEF DESCRIPTION

In accordance with aspects of the present disclosure, a power converter is presented. The power converter includes at least one leg. The at least one leg includes a first string including a plurality of diodes, a first connecting node, and a second connecting node, where the first string is operatively coupled across a first bus and a second bus. Furthermore, the at least one leg includes a second string operatively coupled to the first string via the first connecting node and the second connecting node, where the second string includes a plurality of switching units.

In accordance with yet another aspect of the present disclosure, a system for power conversion is presented. The system includes a power source, a load, and a first power converter. The first power converter includes one or more legs, where each of the one or more legs includes a first string, where the first string includes a plurality of diodes, a first connecting node, a second connecting node, and a third connecting node, and where the first string is operatively coupled across a first bus and a second bus. Also, each of the one or more legs includes a second string operatively coupled to the first string via the first connecting node and the second connecting node, where the second string includes a plurality of switching units. Furthermore, the system includes a controller configured to control switching of the plurality of switching units.

In accordance with yet another aspect of the present disclosure, a system for power conversion is presented. The system includes a power source, a load, and a first power converter. The first power converter includes one or more legs, where each of the one or more legs includes a first string operatively coupled between a first bus and a second bus, where the first string includes a plurality of diodes, a first connecting node, a second connecting node, and a third connecting node, and where the third connecting nodes of the one or more legs are operatively coupled to each other. Also, each of the one or more legs includes a second string operatively coupled to the first string via the first connecting node and the second connecting node, where the second string includes a plurality of switching units. Furthermore, the system includes a controller configured to control switching of the plurality of switching units.

DRAWINGS

Figure 1:
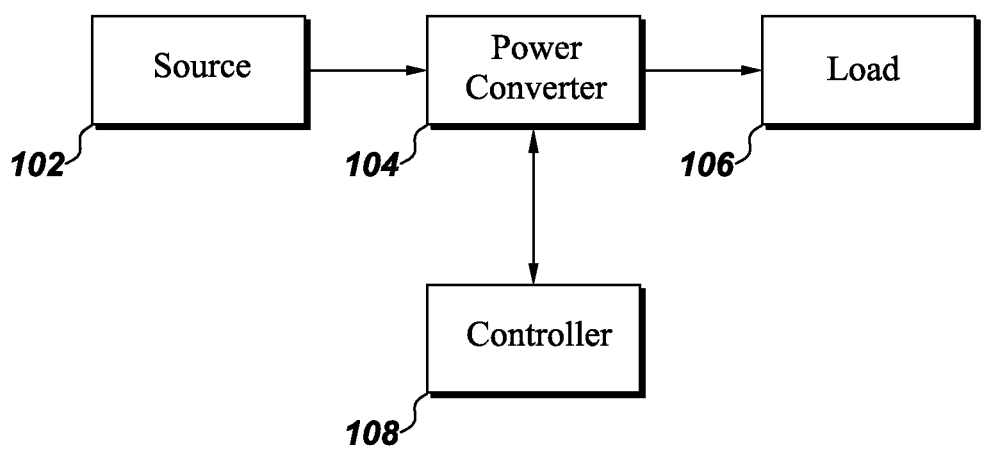
FIG. 1 is a diagrammatical representation of a system for power conversion.
Figure 2:
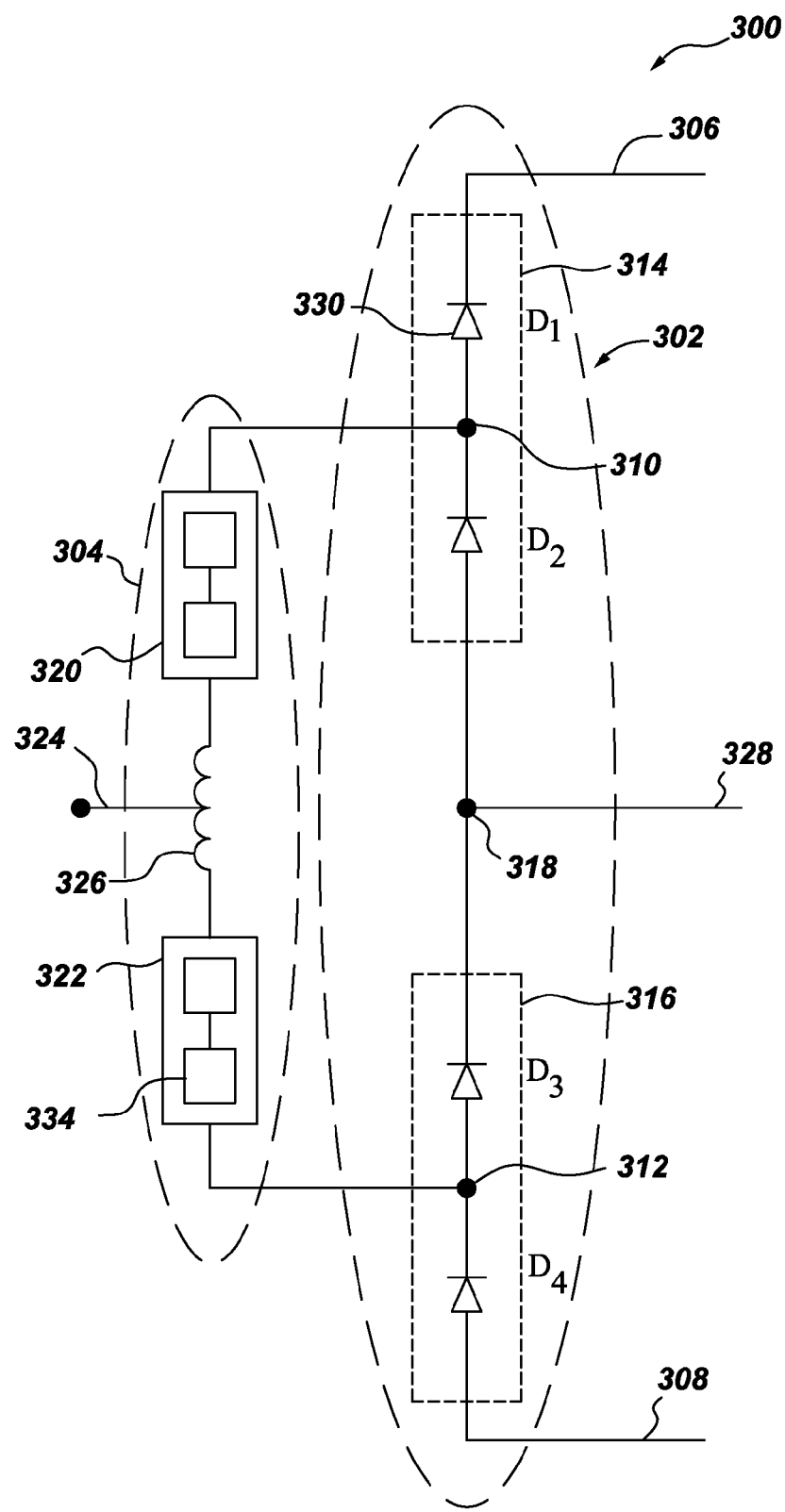
FIG. 2 is a diagrammatical representation of an exemplary embodiment of a portion of a power converter for use in the system of FIG. 1, according to aspects of the present disclosure.
Figure 4:
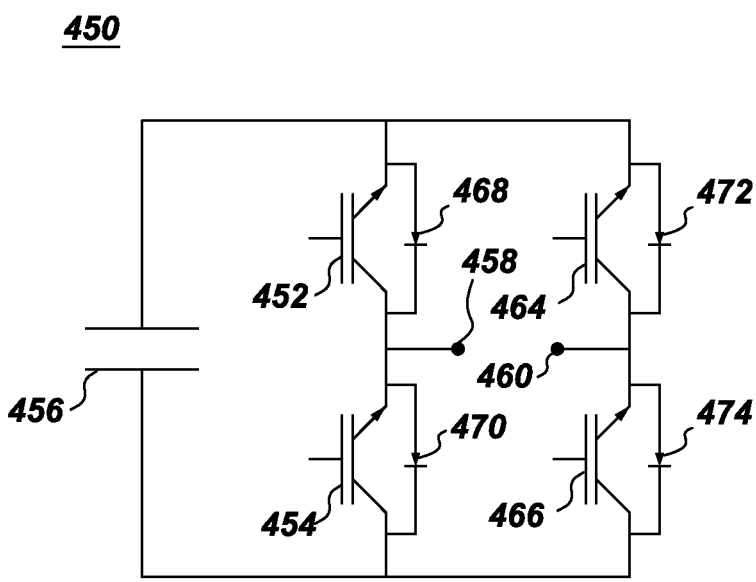
Figure 5:
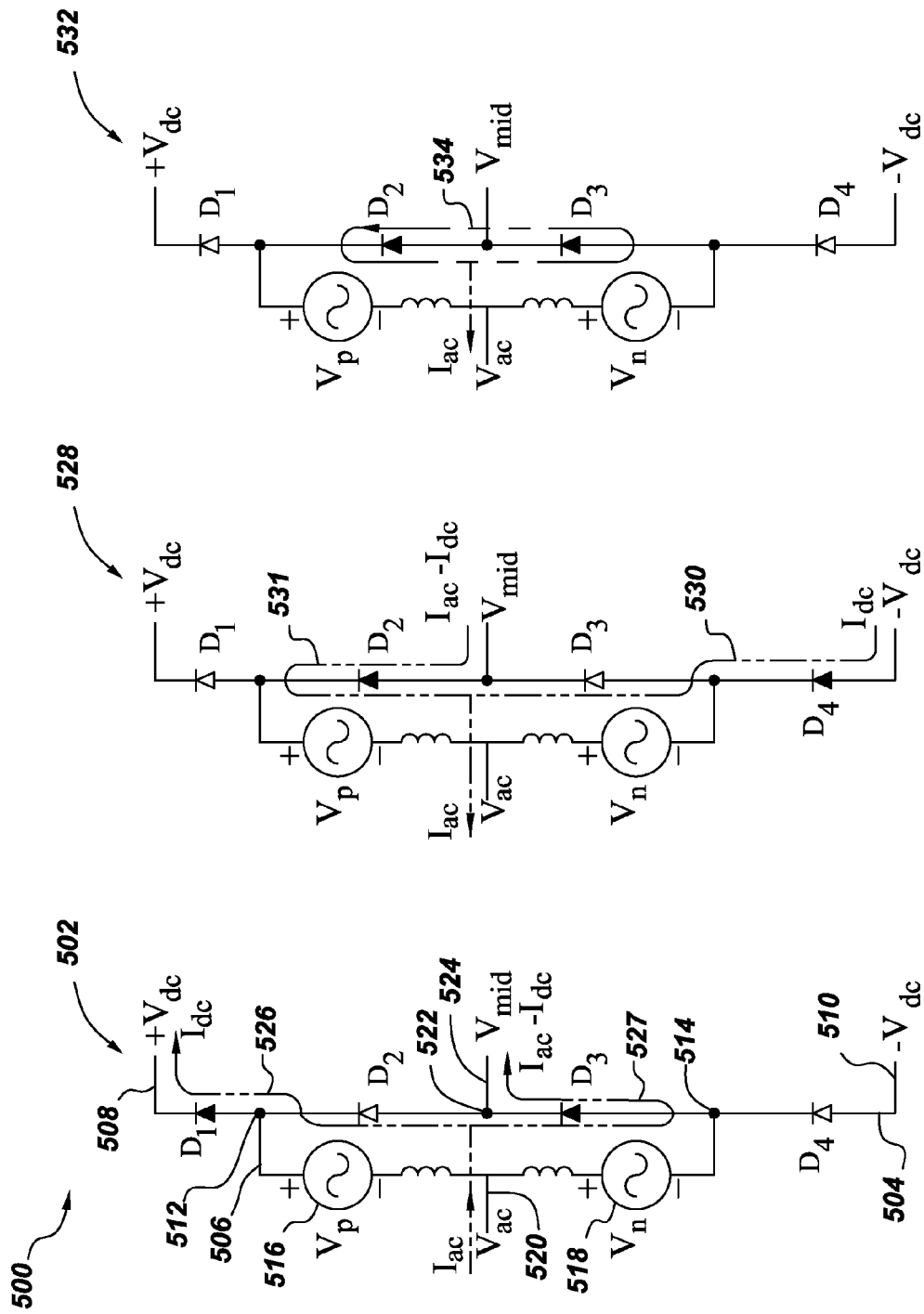
Figure 6:
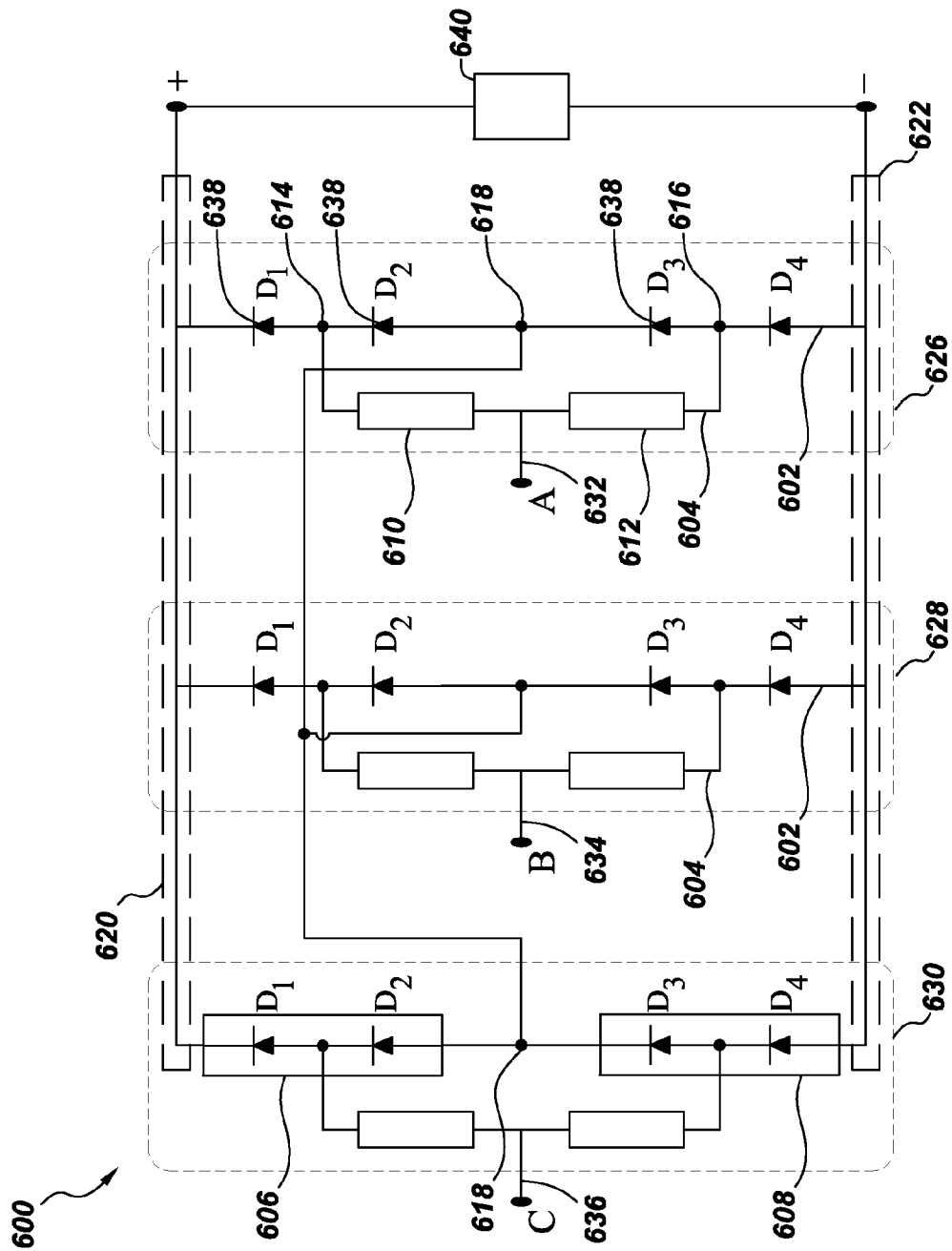

FIG. 4 is a diagrammatical representation of another embodiment of a switching unit for use in the portion of the power converter of FIG. 2, according to aspects of the present disclosure; operating states of a leg of a power rectifier FIGS. 5(a)-5(c) are diagrammatical representations of different operating states of a leg of the power converter of FIG. 2, according to aspects of the present disclosure;

FIG. 6 is a diagrammatical representation of an exemplary embodiment of a three phase power converter for use in the system of FIG. 1, according to aspects of the present disclosure; and FIG. 7 is a diagrammatical representation of voltage waveforms corresponding to different states of three phases in one line cycle, for use in the system of FIG. 6.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system for power conversion and method for power conversion are presented. By employing the power converter and the method for power conversion described hereinafter, a multilevel converter is provided. In one example, the power converter may include a modular multilevel rectifier.

Turning now to the drawings, by way of example in FIG. 1, a system 100 for converting power is depicted. In one embodiment, the system 100 for converting power may include a source 102, a power converter 104, and a load 106. The term source, as used herein, is used to refer to a renewable power source, a non-renewable power source, a generator, a grid, and the like. In addition, the power converter 104 may be a multilevel converter. In one embodiment, the source 102 may be operatively coupled to a first terminal (not shown) of the power converter 104. A second terminal (not shown) of the power converter 104 may be operatively coupled to the load 106 such as an electric drive or a subsea load.

Also, the system 100 may include a controller 108. The controller 108 may be configured to control the operation of the power converter 104, in one embodiment. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a circuit breaker, an inductor, a compensator, a capacitor, a rectifier, a reactor, a filter, and the like.

Turning now to FIG. 2, a diagrammatical representation 300 of an exemplary embodiment of a portion of a power converter, such as the power converter 104 of FIG. 1, is depicted. In particular, a leg 300 of the power converter is depicted in the embodiment of FIG. 2. The leg 300 of the power converter may include a first string 302 and a second string 304. More particularly, the first string 302 may be operatively coupled to the second string 304 to form the leg 300. Furthermore, the first string 302 may be operatively coupled between a first bus 306 and a second bus 308. In one embodiment, the first bus 306 may include a positive DC bus and the second bus 308 may include a negative DC bus. The second string 304 may be operatively coupled to the first string 302 via a first connecting node 310 and a second connecting node 312. Also, the first string 302 may include a first branch 314 operatively coupled to a second branch 316 via a third connecting node 318. Similarly, the second string 304 may include a first portion 320 operatively coupled to a second portion 322 via an AC phase 324 and an inductor 326. The third connecting node 318 may be operatively coupled to a third bus 328.

Moreover, in the present example of FIG. 2, the third bus 328 may be direct current bus and more particularly, a middle DC bus which may be at a negative potential with respect to the first bus 306 and at a positive potential with respect to the second bus 308. In one embodiment, the middle bus may be floating or grounded or a high impedance grounded bus. Also, the first string 302 may include a plurality of diodes 330. Furthermore, in one example, the first branch 314 of the first string 302 may include two diodes $D_1$ and $D_2$. Similarly, the second branch 316 of the first string 302 may include two diodes $D_3$ and $D_4$. It should be noted that the diodes may also be referred to as uncontrollable semiconductor switches.

In addition, the first portion 320 and the second portion 322 of the second string 304 may include a plurality of switching units 334. The switching unit 334 may be a combination of a plurality of fully controllable semiconductor switches and an energy storage device. The fully controllable semiconductor switches may include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof.

Furthermore, the leg 300 may be employed in a power rectifier such as a single phase power rectifier, a two phase power rectifier, a three phase power rectifier, and other equivalent multiphase power rectifiers.

Figure 3:
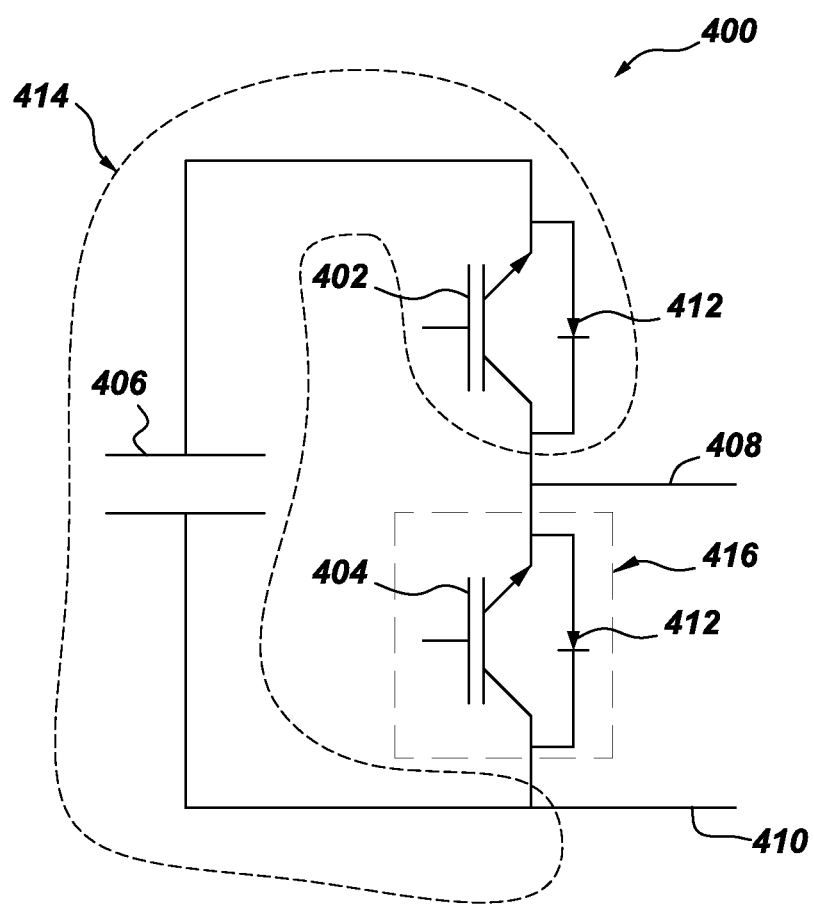
FIG. 3 is a diagrammatical representation of an exemplary embodiment of a switching unit for use in the portion of the power converter of FIG. 2, according to aspects of the present disclosure.

Referring now to FIG. 3, a diagrammatical representation 400 of an exemplary embodiment of a switching unit such as the switching unit 334 of FIG. 2 for use in the leg 300 of FIG. 2, is depicted. In the presently contemplated configuration, the switching unit 400 may be referred to as a half bridge converter and includes fully controllable semiconductor switches 402 and 404, an energy storage device 406, a first connector 408, and a second connector 410. As previously noted, the fully controllable semiconductor switches 402, 404 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 402, 404, may also include a power diode 412 that may be inbuilt and antiparallel to the fully controllable semiconductor switches 402 and 404. The inbuilt power diodes 412 may provide a freewheeling path. These power diodes 412 may also be referred to as freewheeling diodes.

Also, in one non-limiting example, the energy storage device 406 may include a capacitor. In the example of FIG. 3, the fully controllable semiconductor switch 402 may be operatively coupled in series to the energy storage device 406 to form a first limb 414. Also, the other fully controllable semiconductor switch 404 forms a second limb 416. The second limb 416 may be operatively coupled in parallel to the first limb 414. Additionally, the first limb 414 and the second limb 416 may be operatively coupled between the first connector 408 and the second connector 410. Although the example of FIG. 3 depicts the switching units 400 in a half bridge converter configuration as including two fully controllable semiconductor switches, and one energy storage device, use of other numbers of fully controllable semiconductor switches 402, 404, and energy storage devices 406 is also contemplated. In one embodiment, some or all of the switching units may be arranged to form a full bridge converter configuration as will be described in FIG. 4.

Furthermore, in one non-limiting example, when the fully controllable semiconductor switch 402 is activated and the fully controllable semiconductor switch 404 is deactivated, the energy storage device 406 may appear across the first connector 408 and the second connector 410. Consequently, the charge across the energy storage device 406 appears as a voltage across the first connector 408 and the second connector 410. Alternatively, when the fully controllable semiconductor switch 404 is activated and the fully controllable semiconductor switch 402 is deactivated, the first limb 414 is bypassed, thereby providing zero voltage across the first connector 408 and the second connector 410. Hence, by controlling the switching of the fully controllable semiconductor switches 402 and 404 in the plurality of switching units 334 on the second string 304 of FIG. 2, the voltage developed across the second string 304 may be regulated.

Referring now to FIG. 4, diagrammatical representation 450 of an alternative embodiment of switching unit 334 of FIG. 2 is depicted. In the presently contemplated configuration, the switching unit 450 may be referred to as a full bridge converter and may include fully controllable semiconductor switches 452, 454, 464 and 466, an energy storage device 456, a first connector 458, and a second connector 460. As previously noted, the fully controllable semiconductor switches 452, 454, 464 and 466 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 452, 454, 464, 466, may also include a power diode 468, 470, 472 or 474 respectively that may be inbuilt and antiparallel to the fully controllable semiconductor switches. As can be seen, compared to switching unit 400 of FIG. 3, switching unit 450 includes two additional fully controllable semiconductor switches and an output of switching unit 450 appears across first connector 458 and second connector 460. In one embodiment, fully controllable semiconductor switches 452, 454, 464, 466 are controlled to regulate a voltage across first connector 458 and second connector 460. Contrary to switching unit 400, switching unit 450 can produce 3 voltage levels across first connector 458 and second connector 460. The three voltages levels would be a zero voltage level and positive and negative polarity voltage levels, wherein the positive and the negative polarity voltage levels represent a charge across energy storage device 456.

Turning now to FIGS. 5(a)-5(c), diagrammatical representations 500 of different operating states of a leg of a power rectifier, such as the leg 300 of FIG. 2, according to the aspects of the present disclosure, are depicted.

Referring to FIG. 5(a), a diagrammatical representation of a leg 502, such as the leg 300 of FIG. 2, in a first operating state is presented. The first operating state may also be referred to as a positive state. The leg 502 may include a first string 504 and a second string 506. Also, the leg 502 may be operatively coupled between a first bus 508 and a second bus 510. As noted hereinabove, the first bus 508 may include a positive DC bus and the second bus 510 may include a negative DC bus. Furthermore, the first string 504 may be operatively coupled to the second string 506 via a first connecting node 512 and a second connecting node 514.

In addition, a first portion, such as the first portion 320 of FIG. 2 of the second string 506 and a second portion, such as the second portion 322 of FIG. 2 of the second string 506 may be represented by voltage sources $V_p$ 516 and $V_n$ 518, respectively. As noted hereinabove, the second string 506 may include a plurality of switching units (not shown). The first portion of the second string 506 and the second portion of the second string 506 may be operatively coupled via an alternating current phase 520. Also, the first string 504 may include a third connecting node 522, which may be operatively coupled to a third bus 524. Also, in the presently contemplated configuration the first string 504 includes four diodes represented as $D_1$, $D_2$, $D_3$ and $D_4$. Additionally, the voltage at the first bus 508 may be represented as $+V_d$ and the voltage at the second bus 510 may be represented as $-V_{dc}$. By way of example, the voltage of $+V_{dc}$ at the first bus 508 and the voltage of $-V_{dc}$ at the second bus 510 may be with respect to a virtual ground. Also, the voltage at the third bus 524 may be represented as $V_{mid}$, and the voltage at the alternating current phase may be represented as $V_{ac}$. In one embodiment, the third bus 524 may be a ground bus, thus, making voltage $V_{mid}$ as zero.

As depicted in FIG. 5(a), during the first operating state, the diodes $D_1$ and $D_3$ are forward biased and conducting, while diodes $D_2$ and $D_4$ are reverse biased and not conducting. The conduction of diode $D_1$ provides a first current flow path 526 between alternating current phase 520 and the first bus 508 via voltage source $V_p$. Similarly, the conduction of diode $D_3$ provides a second current flow path 527 between the third bus 524 and alternating current phase 520 via voltage source $V_n$. Consequently, the second string 506 may be operatively coupled between the first bus 508 and the third bus 524 in the positive state. Furthermore, while the first and second current flow path 526, 527 are established, the voltage across the first bus 508 and the third bus 524 may depend on the switching of the fully controllable semiconductor switches corresponding to the plurality of switching units in the second string 506, such as the switching units 334 of FIG. 2. A direct current $I_{dc}$ flows through the first bus 306 whereas an AC phase current $I_{ac}$ flows AC phase 520. Similarly, a DC current $I_{ac}$-$I_{dc}$ flow via diode D3 in the third bus 328. In one embodiment, AC current $I_{ac}$ is kept higher than DC current $I_{dc}$, and thus, the power factor is close to 1 and system modulation index (Vac_peak/Vdc) is less than 1.

In a similar fashion, FIG. 5(b) is a diagrammatical representation 528 of a leg in a second operating state. The second operating state may also be referred to as a negative state. For ease of understanding, FIG. 5(b) is explained with reference to FIG. 5(a). In the second state, diodes $D_2$ and $D_4$ are forward biased and are conducting, while diodes $D_1$ and $D_3$ are reverse biased and are not conducting. The conduction of diode $D_2$ may result in providing a third current flow path 531 between the third bus 524 and the alternating current phase 520. Similarly, the conduction of diode $D_4$ may result in providing a fourth current flow path 530 between the second bus 510 and the alternating current phase 520. Accordingly, the second string 506 may be operatively coupled between the second bus 510 and the third bus 524 in the negative state. As in the positive state, AC phase current $I_{ac}$ flowing through AC phase 520 is supported by two DC currents $I_{dc}$ and $I_{ac}$-$I_{dc}$ flowing through the second bus 308 and third bus 328 respectively.

Similarly, FIG. 5(c) is a diagrammatical representation 532 of a leg in a third operating state. The third operating state may also be referred to as a zero state. For ease of understanding, FIG. 5(c) is explained with reference to FIG. 5(a). Furthermore, in the third state, the diodes $D_2$ and $D_3$ may be forward biased and are conducting, while the diodes $D_1$, and $D_4$ are reverse biased and are not conducting. The conduction of the diodes $D_2$ and $D_3$ may result in providing a fifth current flow path 534. Subsequently, the current flows in the third current flow path 534. It should be noted that diodes $D_2$ and $D_3$ may not conduct simultaneously rather diode $D_2$ may conduct in one half cycle whereas diode $D_3$ may conduct for other half cycle of AC phase current $I_{ac}$. In addition, both ends of the second string 506 may be operatively coupled to each other via the diodes $D_2$ and $D_3$ and the third bus 524. Although, FIGS. 5(a)-5(c) represent the three operating states with reference to a single leg, these three operating states may be employed simultaneously for a plurality of legs in a two phase power rectifier, a three phase power rectifier, and the like.

As depicted in FIGS. 5(a)-5(c) at any instant in time, the second string 506 is operatively coupled between the first bus 508 and third bus 524, between the third bus 524 and the second bus 510, or both ends of the second string 506 may be operatively coupled to a third bus 524. Hence, the second string 506 may have to withstand a maximum voltage of value $V_{dc}$. Accordingly, for effective control of the power converter, the first portion of the second string 506 and the second portion of the second string 506 may each have to withstand a maximum voltage of $V_{dc}$. Consequently, a desired number of switching units in the second string 506 may be less compared to a conventional rectifier. In addition, the rating of the switching units of the second string 506 may also be reduced. Accordingly, the rating of each switching unit of the second string 506 may be only $V_{dc}/N_1$, where $N_1$ is the number of switching units in each of the first and second portions of the second string 506. Hence, the rating of each switching unit may be $2V_{dc}/N$, where N is the number of switching units in the second string 506 and $N=2N_1$.

Referring to FIG. 6, a diagrammatical representation 600 of an exemplary embodiment of a three phase multilevel rectifier, according to aspects of the present disclosure, is depicted. In the example of FIG. 6, the power converter 600 is a three phase modular multilevel rectifier. In a presently contemplated configuration, the three phase multilevel rectifier 600 includes three legs 626, 628, 630. Each leg may include a respective first and second string 602, 604.

Furthermore, the first string 602 includes a first branch 606 and a second branch 608. Also, one end of the second string 604 may be operatively coupled to a first connecting node 614 of a respective first string 602, and the other end of the second string 604 may be operatively coupled to a second connecting node 616 of the same first string 602. In particular, one end of a first portion 610 of the second string 604 may be operatively coupled to the first string 602 via the first connecting node 614. The first connecting node 614 may be situated between two diodes 638 ($D_1$ and $D_2$) of the first branch 606 of the first string 602. In addition, one end of a second portion 612 of the second string 604 may be operatively coupled to the first string 602 via the second connecting node 616. Further, the second connecting node 616 may be situated between two diodes 638 ($D_3$ and $D_4$) of the second branch 608 of the first string 602.

The first portion 610 of the second string 604 may be operatively coupled to the second portion 612 of the second string 604 via a fourth bus. The term fourth bus, as used herein, may be an alternating current (AC) phase. In particular, each of the three legs 626, 628, 630 may be associated with at least one AC phase. In a non-limiting example, a three phase AC system may include an AC phase-A 632, an AC phase-B 634, and an AC phase-C 636. Additionally, a DC terminal may be formed by a combination of a first bus 620 and a second bus 622. Also, the AC phases, AC phase-A 632, AC phase-B 634, and AC phase-C 636 in combination may form an AC terminal. In the example of FIG. 6, a load 640 may be operatively coupled across the DC terminal or between the first bus 620 and the second bus 622. Furthermore, first bus 620 is a positive DC bus whereas second bus 622 is a negative DC bus.

In addition, the first branch 606 may be operatively coupled to the second branch 608 via a third connecting node 618. In one embodiment, the third connecting node 618 may be the middle point of the first string 602. Furthermore, in one example, the third connecting nodes 618 of each of the three first strings 602 may be operatively coupled to each other to form a floating point. In another embodiment, the third connecting nodes 618 of each of the three first strings 602 may be operatively coupled to a third bus 624. The third bus 624 is a middle bus which may be floating or grounded or a high impedance grounded bus. However, in another embodiment, for applications in machine drives, the third connecting nodes 618 of each of the three first strings 602 may be operatively coupled to a neutral bus. Moreover, the three legs 626, 628, 630 may be operatively coupled between the first bus 620 and the second bus 622.

Furthermore, the power rectifier 600 may be operatively coupled to a controller such as the controller 108 of FIG. 1. As previously noted, the first strings 602 may include a plurality of diodes, while the second strings 604 may include a plurality of switching units such as half bridge or full bridge converters. The controller may be configured to control the switching of the plurality of switching units in the second strings 604. In one example, the switching of the switching units in the second strings 604 may be based on a modulation technique. The modulation technique may include pulse width modulation technique, space vector modulation, and the like. Moreover, the controller may be configured to aid in the generation of a direct voltage across first bus 620 with respect to the second bus 622. Also, the controller may be configured to balance and regulate energy stored in the second string 604 during a line cycle. Accordingly, the controller may be configured to ensure that an average power of a second string 604 during one line cycle is zero. The term line cycle, as used herein, may be an AC voltage cycle. In one embodiment, the controller may be disposed at a remote location.

Referring to FIG. 7, a diagrammatical representation 900 of voltage waveforms corresponding to the different operating states of three AC phases in one line cycle 901, according to the aspects of the present disclosure, is depicted. For ease of understanding, FIG. 7 will be described with respect to FIGS. 5(a)-5(c) and 6. In a presently contemplated configuration, the line cycle 901 may be partitioned into six sections 902, 904, 906, 908, 910, 912. Also, the three AC phases may include the AC-phase A 632, the AC phase-B 634, and the AC phase-C 636. In the example of FIG. 7, voltage waveforms corresponding to the AC three phases A, B, and C are presented. The voltage waveforms corresponding to the three phases may include a first voltage waveform 914 corresponding to AC phase-A, a second voltage waveform 916 corresponding to AC phase-B, and a third voltage waveform 918 corresponding to AC phase-C.

Also, the six sections 902, 904, 906, 908, 910, and 912 may have corresponding switching patterns to generate desired outputs. During a portion of the line cycle 901 corresponding to each section, that section may have one or two legs in a positive state and other legs in a negative state. Furthermore, the line cycle 901 of the three AC phases may include six transient zones 920, 922, 924, 926, 928, and 930. The term transient zone, as used herein, is used to refer to a zone during which at least one of the legs 626, 628, 630 transitions from one state to another. In one non-limiting example, at the transient zone 922, the state of the leg 630 associated with AC phase C changes from a positive state to a negative state.

Furthermore, during a transition between two adjacent sections, one of the legs may be in the positive state, while another leg may be in the negative state, and yet another leg may be in the zero state. In particular, in the section 902, the leg 626 associated with AC phase A and the leg 630 associated with AC phase C may be in the positive state, while the leg 628 associated with AC phase B may be in the negative state. Also, the leg 626 associated with AC phase A and the leg 630 associated with AC phase C may be operatively coupled in parallel to each other between the first bus 620 and the third bus 624. Particularly, the second string 604 associated with the AC phase-A and the second string 604 associated with the AC phase-C may be operatively coupled in parallel to each other between the first bus 620 and the third bus 624 through diodes $D_1$ and $D_3$ of the corresponding first strings 602. Moreover, the leg 628 associated with AC phase B may be operatively coupled between the third bus 624 and the second bus 622. In particular, the diodes $D_2$ and $D_4$ corresponding to the first string 602 associated with AC phase B may be forward biased and start conducting. Accordingly, the leg 626 associated with AC phase A and the leg 630 associated with AC phase C may be operatively coupled in parallel to each other and further operatively coupled in series to the leg 628 associated with AC phase B, as indicated by reference numeral 932.

With continuing reference to FIG. 7, the section 902 is followed by the transient zone 922. At the transient zone 922, the leg 626 associated with AC phase A continues to be in the positive state and the leg 628 associated with AC phase B continues to be in negative state. However, the leg 630 associated with AC phase C transitions from the positive state to the zero state, as indicated by reference numeral 934. The diodes $D_2$ and $D_3$ of the first string 602 associated with AC phase C may be forward biased and start conducting. Consequently, when the leg 630 associated with AC phase C is in the zero state, both ends of the leg 630 may be operatively coupled to the third bus 624.

Prior to the transient zone 922, the leg 630 associated with AC phase C is in a positive state in the section 902. Hence, at the transient zone 922, the diode $D_1$ corresponding to the first string 602 associated with AC-phase C may be reverse biased and stop conducting and the diode $D_2$ corresponding to the first string 602 associated with AC-phase C may be forward biased and start conducting. Also, at section 902, as previously noted, the leg 626 associated with AC phase A and the leg 630 associated with AC phase C may be operatively coupled in parallel to each other between the first bus 620 and the third bus 624 through the corresponding forward biased diodes $D_1$ and $D_3$. Therefore, the DC current on the first bus 620 is shared by the leg 626 associated with AC phase A and the leg 630 associated with AC phase C.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the power converter and the methods of power conversion described hereinabove aid in developing multilevel power rectifiers, thereby allowing generation of high DC power/voltage/current output. Furthermore, since the diodes are used in the main three level structure, the system cost is significantly reduced with higher reliability. Advantages of the present technique include excellent harmonic performance and low switching losses.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter, comprising:
at least two legs, each leg comprising:
a first string comprising a plurality of diodes, a first connecting node, and a second connecting node, wherein the first string is operatively coupled across a first bus and a second bus, wherein the first string comprises a first branch and a second branch, and wherein the second branch is operatively coupled to the first branch via a third connecting node;
a second string operatively coupled to the first string via the first connecting node and the second connecting node, wherein the second string comprises a plurality of switching units;
wherein the third connecting nodes of the at least two legs are directly connected to each other;
wherein the second string comprises a first portion; and
a second portion operatively coupled to the first portion via an inductor, wherein each of the first and second portions comprises the plurality of switching units each having a plurality of fully controllable semiconductor switches and at least one energy storage device; and
wherein at least one of the plurality of fully controllable switches of the plurality of switching units is coupled in series with the at least one energy storage device to form a first limb, and the other fully controllable switches of the plurality of switching units form a second limb, and wherein the first limb is coupled in parallel with the second limb.

2. The power converter of claim 1, wherein the plurality of switching units comprises a half bridge converter, a full bridge converter or combinations thereof.

3. The power converter of claim 1, wherein the first bus comprises a positive direct current bus and the second bus comprises a negative direct current bus.

4. The power converter of claim 1, wherein third connecting nodes of the at least two legs are operatively coupled to a third bus.

5. The power converter of claim 4, wherein the third bus comprises a direct current bus, a floating bus, a grounded bus or high impedance grounded bus.

6. The power converter of claim 1, wherein the first and second portions of the second string are operatively coupled to a fourth bus.

7. The power converter of claim 6, wherein the fourth bus comprises an alternating current phase.

8. The power converter of claim 6, wherein a controller operates each of the one or more legs in a positive state or a negative state or a zero state.

9. The power converter of claim 8, wherein in the positive state, the first portion and the second portion are connected between the first bus and the third bus, in the negative state, the first portion and the second portion are connected between the third bus and the second bus and in the zero state, the first portion and the second portion both are connected to the third bus.

10. A system for power conversion, comprising:
a power source;
a load;
a first power converter, comprising:
at least two legs, wherein each leg comprises:
a first string comprising a plurality of diodes, a first connecting node, a second connecting node, and a third connecting node, wherein the first string is operatively coupled across a first bus and a second bus, wherein the first string comprises a first branch and a second branch, and wherein the second branch is operatively coupled to the first branch via a third connecting node;
a second string operatively coupled to the first string via the first connecting node and the second connecting node, wherein the second string comprises a plurality of switching units;
wherein the third connecting nodes of the at least two legs are directly connected to each other;
wherein the second string comprises a first portion; and
a second portion operatively coupled to the first portion via an inductor, wherein each of the first and second portions comprises the plurality of switching units each having a plurality of fully controllable semiconductor switches and at least one energy storage device;
wherein at least one of the plurality of fully controllable switches of the plurality of switching units is coupled in series with the at least one energy storage device to form a first limb, and the other fully controllable switches of the plurality of switching units form a second limb, and wherein the first limb is coupled in parallel with the second limb; and
a controller configured to control switching of the plurality of switching units.

11. The system of claim 10, wherein the power source comprises a grid and the load comprises an electric drive or a subsea load.

12. The system of claim 10, wherein the controller is further configured to regulate energy stored in the second string during a line cycle.

13. The system of claim 10, wherein the plurality of switching units comprise a half bridge converter, a full bridge converter, or a combination thereof.

14. The power converter of claim 10, wherein the first and second portions of the second string are operatively coupled to an alternating current phase.

15. A system for power conversion, comprising:
a power source;
a load;
a first power converter, comprising:
at least two legs, wherein each leg comprises:
a first string operatively coupled between a first bus and a second bus, wherein the first string comprises a plurality of diodes, a first connecting node, a second connecting node, and a third connecting node, and wherein the third connecting nodes of the at least two legs are directly connected to each other;
a second string operatively coupled to the first string via the first connecting node and the second connecting node, wherein the second string comprises a plurality of switching units;
wherein the second string comprises a first portion; and
a second portion operatively coupled to the first portion via an inductor, wherein each of the first and second portions comprises the plurality of switching units each having a plurality of fully controllable semiconductor switches and at least one energy storage device;
wherein at least one of the plurality of fully controllable switches of the plurality of switching units is coupled in series with the at least one energy storage device to form a first limb, and the other fully controllable switches of the plurality of switching units form a second limb, and wherein the first limb is coupled in parallel with the second limb; and
a controller configured to control switching of the plurality of switching units.

16. The system of claim 15, wherein the third connecting nodes of the at least two legs are operatively coupled to a third bus.

* * * * *

UNITED STATES PATENT AND TRADEMARK OFFICE
CERTIFICATE OF CORRECTION

| | |
|---|---|
| PATENT NO. | : 9,515,568 B2 |
| APPLICATION NO. | : 14/229074 |
| DATED | : December 6, 2016 |
| INVENTOR(S) | : Zhang et al. |

It is certified that error appears in the above-identified patent and that said Letters Patent is hereby corrected as shown below:

In the Specification

In Column 4, Line 9, delete "insulated" and insert -- integrated --, therefor.

In Column 5, Line 63, delete "+$V_d$" and insert -- +$V_{dc}$ --, therefor.

Signed and Sealed this
Fourteenth Day of March, 2017

Michelle K. Lee
*Director of the United States Patent and Trademark Office*